United States Patent [19]

Shiroyama et al.

[11] 3,753,745

[45] Aug. 21, 1973

[54] ZIRCONIUM OXIDE SERIES SPRAYING MATERIAL

[75] Inventors: Masaharu Shiroyama; Eiji Noguchi, both of Fukuoka, Japan

[73] Assignee: Nippon Tungsten Company, Ltd., Fukuoka-shi, Japan

[22] Filed: June 4, 1971

[21] Appl. No.: 150,098

[30] Foreign Application Priority Data
June 4, 1970 Japan.............................. 45/48517

[52] U.S. Cl. ................................................ 106/57
[51] Int. Cl............................................. C04b 35/48
[58] Field of Search........................ 106/57; 252/513, 252/520

[56] References Cited
UNITED STATES PATENTS

| | | | |
|---|---|---|---|
| 2,997,413 | 8/1961 | Wagner.................................. | 106/57 |
| 3,049,432 | 8/1962 | Weber................................... | 106/57 |
| 3,171,774 | 3/1965 | Wheildon.............................. | 106/57 |
| 3,329,558 | 7/1967 | Wheildon.............................. | 106/57 |
| 3,625,717 | 12/1971 | Grubba et al........................ | 106/57 |

*Primary Examiner*—James E. Poer
*Attorney*—Linton & Linton

[57] ABSTRACT

Zirconium-oxide series spraying materials in a powdered form prepared by mixing zirconium oxide powder with nickel or nickel oxide powder, pressing the mixture into a block, sintering the same under an oxidizing or reducing atmosphere into a briquette, then grinding the same and size-grading the resulting particles.

2 Claims, No Drawings

ZIRCONIUM OXIDE SERIES SPRAYING MATERIAL

The present invention relates to ziroconium oxide series spraying material capable of providing a dense coating on a metallic substrate and an excellent adhesion thereto.

Ceramic materials such as aluminum oxide and zirconium oxide have been used as heat-resistant spraying material because of their high melting point, high hardness, high heat insulating property, high wear resistance at an elevated temperature and low wettability to molten metals. Such materials, however, which have been used hithertofore, have some disadvantages in that they have a high porosity of 8–20 percent of the sprayed coating, a low adhering strength to a substrate of 40–100 Kg/sq. cm which tends to cause cracking in the sprayed coating and exfoliation from a substrate and limits the application where the thermal change is restricted in a somewhat narrow range and the load on the coating is rather low.

The present invention eliminates the above-mentioned defects and provides novel spraying materials which can form a dense coating having an excellent adhesion to a substrate.

The zirconium oxide series spraying materials of the present invention may be prepared by grinding and mixing zirconium oxide powder with nickel powder or nickel oxide powder in an amount of 20–60 Ni percent by weight of zirconium oxide, pressing the mixture into a block, sintering the block under an oxidizing or reducing atmosphere to form a briquette, grinding the same, and size-graded to 140–325 mesh (ASTM) particles.

The inclusion of 20–60 Ni percent by weight of nickel or nickel oxide into zirconium oxide in the present invention has been determined by a fact that an amount of the inclusion of nickel or nickel oxide less than 20 Ni percent has no effect in densifying a coating, and an amount over 60 Ni percent causes a loss of the desired properties of zirconium oxide of its high melting point, high hardness, high heat insulating property, wear resistance at an elevated temperature and low wettability of molten metals.

In accordance with the present invention, a very dense coating having a porocity less than 5 percent and an adherence strength to a substrate of more than 300 Kg/sq. cm is obtained by a flame spraying use of oxyacetylene, and a non-porous coating having an adherence strength of more than 500 Kg/sq. cm may be obtained by a plasma spraying, thus providing for a high protective coating to the substrate and a high thermal shock resistance.

Some examples of the present invention will be described as follows:

Example 1

Nickel oxide particles less than 200 mesh were mixed with zirconium oxide particles again less than 200 mesh in a weight ratio of 38/62, the mixture was ground by ball-milling, then the resulting particles were compressed under a pressure of 300 Kg/sq. cm into a block, and then the block was sintered into a briquette under a temperature of 1,400° C in the atmosphere. The sintered block was then ground, and the resulting particles were size-graded to obtain zirconium oxide particles containing nickel oxide particles of 140–325 mesh.

These particles were sprayed on a substrate of mild steel, using the oxy-actylene flame, up to a thickness of 0.3 mm, providing a sprayed coating having a porosity of 3 percent and an adhesion strength of 370 Kg/sq. cm.

A subsrate 1 was covered by a sprayed coating 2 wherein nickel oxide in white color was uniformly dispersed in zirconium oxide in black color.

The weight increment verse oxidation time measured during a period of time while maintaining the coating at 1,000° C in the atmosphere, proves that there is no weight increment after approximately 20 hours. A series of thermal shock test in which a test piece heated up to 1,000° C in the atmosphere is immersed in cold water, and the sprayed coating is observed after 30 times repetition of such heating and immersion, showed that there was no cracking in the coating and peeling off from the substrate. Another test in which a test piece is immersed in a molten pig iron at 1,500° C showed no cracking and peeling off of the sprayed coating.

Example 2

In a similar manner to Example 1, nickel oxide powder and zirconium oxide powder both less than 200 mesh were mixed together in a weight ratio of 38/62, and the mixture was ball-milled, compressed under a pressure of 300 Kg/sq. cm into a block, then said block was sintered into a briquette under a temperate of 1,400° C and hydrogen atmosphere, and then the briquette was ground. The particles were size-graded to obtain zirconium oxide containing nickel oxide of 140–325 mesh.

These particles were spray coated on a substrate of a copper plate using a plasma torch to form an undercoating having a thickness of 0.1 mm and an adherence strength of 500 Kg/sq. cm, on which aluminum oxide was coated up to a thickness of 0.3 mm. In the test of immersion into a molten pig iron having a temperature of 1,500° C for 5 seconds similar to Example 1, there was observed no cracking and peeling off in the coating as well as adhesion of the pig iron.

Example 3

Nickel powder and zirconium oxide powder both of less than 200 mesh were mixed together in a weight ratio of 32/68, and the mixture was ball-milled, compressed under a pressure of 300 Kg/sq. cm into a block, then said block was sintered into a briquette under a temperature of 1,400° C and in a hydrogen atmosphere. Then the briquette was ground. The resulting particles were size-graded to obtain zirconium oxide of 140–325 mesh containing nickel.

These particles were spray coated on a substrate of mild steel using the oxy-acetylene flame up to a thickness of 0.3 mm. providing a sprayed coating having a porosity of 5 percent and an adhesion strength over 300 Kg/sq. cm.

As ascertained in the above-mentioned examples, the zirconium oxide series spraying materials of the present invention comprising nickel or nickel oxide give a sprayed coating over that obtained from the prior art ceramic materials in respect of porosity and adherence strength as well as thermal shock resistance. Furthermore, the materials of the present invention are of high oxidation resistance at an elevated temperature giving a high protecting property, and hence they may also be used solely and/or in combination with other ceramic materials as an undercoating in furnace member, tuyere, mold, nozzle for burning material effectively and a variety of applications.

We claim:

1. Method of preparing zirconium oxide series spraying materials consisting in mixing zirconium oxide powder with a material from the group consisting of nickel or nickle oxide powder in a weight ratio of 20–60 percent nickel to 80–40 percent zirconium oxide, thoroughly grinding said mixture, compressing a quantity of said mixture to form a block, sintering the block at a temperature of 1,400° C under an oxidizing atmosphere, grinding said block into particles, and then size-grading to obtain 140–325 mesh particles.

2. Method of preparing zirconium oxide series spraying materials consisting in mixing zirconium oxide powder with material from the group consisting of nickel or nickel oxide powder in a weight ratio of 20–60 percent nickel to 80–40 percent zirconium oxide, thoroughly grinding said mixture, compressing a quantity of said mixture to form a block, sintering the block at a temperature of 1,400° C under a reducing atmosphere, grinding said block into particles, and then size-grading to obtain 140–325 mesh particles.

* * * * *